F. McDONOUGH.
DEVICES FOR COOLING SAWS.

No. 195,626. Patented Sept. 25, 1877.

WITNESSES:
O.W. Bond
William Westlake

INVENTOR:
Frank McDonough
By West & Bond, Attys.

UNITED STATES PATENT OFFICE.

FRANK McDONOUGH, OF EAU CLAIRE, WISCONSIN.

IMPROVEMENT IN DEVICES FOR COOLING SAWS.

Specification forming part of Letters Patent No. 195,626, dated September 25, 1877; application filed November 4, 1875.

*To all whom it may concern:*

Be it known that I, FRANK MCDONOUGH, of Eau Claire, Eau Claire county, State of Wisconsin, have invented a new and useful Improvement in Devices for Cooling Saws and Journals, of which the following is a full description, reference being had to the accompanying drawings, in which—

Figure 1:
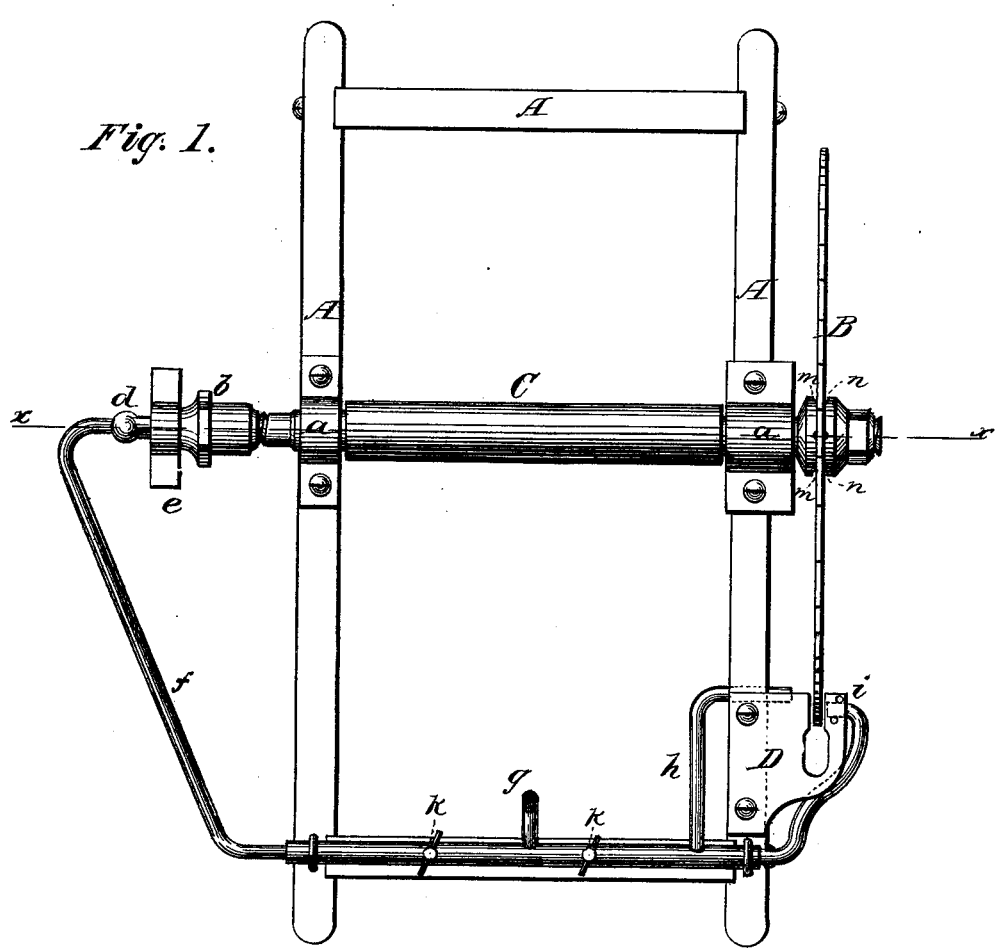
Figure 2:
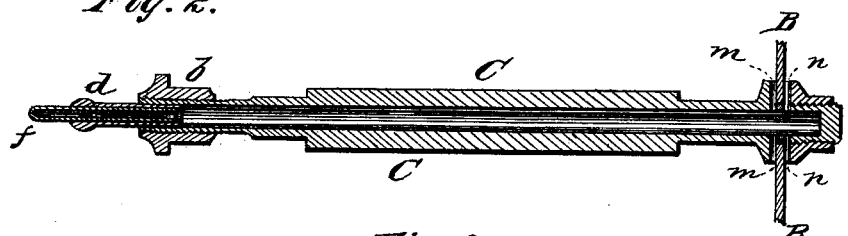
Figure 3:
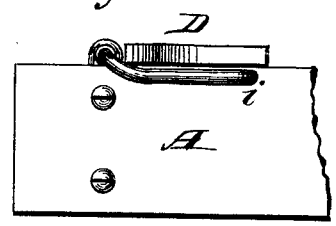

Figure 1 is a plan view; Fig. 2, a vertical section on line $x\ x$ of Fig. 1, the frame being removed; and Fig. 3, a detail.

Circular saws, especially those which are large, are liable to be heated while running, and, in consequence of inequalities in the metal, or from other cause, when hot will spring and warp, producing great friction and cutting unevenly.

The object of my invention is to keep the saw cool; and it consists in devices for conveying fine streams of water to the saw, either at or near the center, or near the periphery, or both, if desired, as hereinafter fully described.

In the drawings, A represents the frame that supports the journal upon which the saw is placed. B is the saw; C, the journal, which carries the saw. It is supported in bearings at $a$. The end of the journal opposite to that which carries the saw extends beyond the frame, and is provided with a screw-thread, and is connected with the coupling $b$ by means thereof. This coupling revolves upon the pin $d$, which is supported in a fixed position in the standard $e$. The journal, the coupling $b$, and the pin $d$ are hollow, except that the end of the journal where the saw is located is closed. $f$ is a tube, one end of which is inserted tightly into the outer end of $d$. This tube, as shown, is carried across one end of the frame A, and is secured thereto, and is extended so that the end $i$ opens upon the outside of the saw at or near the teeth. $h$ is a tube running from $f$ to the inside of the saw at or near the teeth. $g$ is a tube opening into $f$, and communicating with a force-pump, or other suitable water-supply. $k\ k$ are cocks to regulate or cut off the flow of water. $m$ are openings from the interior of the journal C, through the collar on the inside of the saw, for the passage of water. $n$ are similar openings through the collar on the outside of the saw.

In use, water under suitable pressure is admitted into the pipe $f$ through $g$, and will pass to the center of the saw through $f$ into the journal C, and through the journal, passing out in fine jets through the openings $m$ and $n$, and be thrown upon the saw, both upon the inside and also upon the outside thereof, and, by centrifugal or other force, will be thrown to the periphery of the largest saws. At the same time, if desired, water will flow thrown $h$ and $i$, and be thrown upon the saw and upon both sides.

Four openings, $m$, and four, $n$, will be sufficient. A greater or less number may be used, according to size. They may be quite small.

A small quantity of cold water constantly flowing will keep the saw cool, and at an even temperature.

As shown, $h$ and $i$ come to the saw just beneath he saw-guide D—a convenient and desirable location.

The arrangement and location of the pipes and outlets may be varied.

I have described my device as applied to circular saws only.

It is manifest that the journals will be kept cool by the flow of the water through the axle; and this invention can be used for cooling journals which do not carry a saw, in which case the water flowing through the axle may be permitted to escape at the end and be conducted away in any convenient manner.

What I claim as new, and desire to secure by Letters Patent, is as follows:

1. The hollow journal C, provided with outlets for the passage of water, in combination with the water-pipe $f$, all constructed and operating substantially as and for the purpose specified.

2. An inlet-pipe, $g$, in combination with one or more outlet-pipes, $h\ i$, so arranged as to throw one or more jets of water upon the saw B, substantially as and for the purpose specified.

3. The method, herein described, of keeping saws cool while in use, by bringing to and throwing on the same jets of water from the center, substantially as specified.

FRANK McDONOUGH.

Witnesses:
B. S. PHILLIPS,
R. H. CHUTE.